United States Patent
Min et al.

(10) Patent No.: US 10,712,161 B2
(45) Date of Patent: *Jul. 14, 2020

(54) SYSTEM AND METHOD OF NAVIGATION

(71) Applicant: Alibaba Group Holding Limited, Grand Cayman (KY)

(72) Inventors: Wanli Min, Hangzhou (CN); Rui Wang, Hangzhou (CN); Yu Wang, Hangzhou (CN); Jinming Wang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/218,996

(22) Filed: Dec. 13, 2018

(65) Prior Publication Data
US 2019/0120638 A1  Apr. 25, 2019

Related U.S. Application Data

(63) Continuation of application No. 15/445,126, filed on Feb. 28, 2017, now Pat. No. 10,156,450.

(30) Foreign Application Priority Data

Mar. 1, 2016  (CN) .......................... 2016 1 0116317

(51) Int. Cl.
*G01C 21/34* (2006.01)
*G08G 1/0968* (2006.01)
(Continued)

(52) U.S. Cl.
CPC ......... *G01C 21/3415* (2013.01); *G01C 21/28* (2013.01); *G01C 21/3492* (2013.01);
(Continued)

(58) Field of Classification Search
CPC ............... G01C 21/3415; G01C 21/28; G01C 21/3492; G01C 21/3694; G08G 1/0968;
(Continued)

(56) References Cited

U.S. PATENT DOCUMENTS 6,166,658 A   12/2000  Testa
6,427,113 B1   7/2002  Rahman
(Continued)

FOREIGN PATENT DOCUMENTS

JP    2008296798 A    12/2008

OTHER PUBLICATIONS

Extended European Search Report to corresponding EP Application No. 17760671.2 dated Sep. 2, 2019 (10 pages).
(Continued)

*Primary Examiner* — Gertrude Arthur Jeanglaude
(74) *Attorney, Agent, or Firm* — James J. DeCarlo; Greenberg Traurig, LLP

(57) ABSTRACT

Disclosed are systems, methods, and apparatuses for providing navigation. In one embodiment, the method comprises receiving a starting point and a destination from a user; calculating a plurality of routes between the starting point and the destination; receiving traffic information and traffic sign information associated with the plurality of routes; calculating transportation conditions during a set period of time in the future for each of the plurality of routes based on the traffic information and traffic sign information; selecting a recommended route from the plurality of routes based on the transportation conditions; and displaying the recommended route.

20 Claims, 13 Drawing Sheets

(51) Int. Cl.
*G08G 1/0969* (2006.01)
*G01C 21/28* (2006.01)
*G01C 21/36* (2006.01)
*G01S 19/13* (2010.01)

(52) U.S. Cl.
CPC ......... *G08G 1/0968* (2013.01); *G08G 1/0969* (2013.01); *G08G 1/096811* (2013.01); *G08G 1/096833* (2013.01); *G01C 21/3694* (2013.01); *G01S 19/13* (2013.01)

(58) Field of Classification Search
CPC ....... G08G 1/096811; G08G 1/096833; G08G 1/0969; G01S 19/13
USPC .......................................................... 701/414
See application file for complete search history.

(56) References Cited

U.S. PATENT DOCUMENTS

| | | | |
|---|---|---|---|
| 7,433,889 | B1 | 10/2008 | Barton |
| 7,761,225 | B2 | 7/2010 | Vaughn |
| 8,040,254 | B2 | 10/2011 | Delia et al. |
| 8,364,334 | B2 | 1/2013 | Au et al. |
| 8,467,965 | B2 | 6/2013 | Chang |
| 8,612,136 | B2 | 12/2013 | Levine et al. |
| 8,626,439 | B2 | 1/2014 | Zhou |
| 8,700,299 | B2 | 4/2014 | Morita et al. |
| 8,972,145 | B2 | 3/2015 | Mahler et al. |
| 9,076,332 | B2 | 7/2015 | Myr |
| 9,142,127 | B1 | 9/2015 | McDevitt-Pimbley et al. |
| 9,165,465 | B2 | 10/2015 | Kosatka-Pioro et al. |
| 9,189,976 | B2 | 11/2015 | Wang |
| 9,336,681 | B2 | 5/2016 | Annapureddy et al. |
| 10,156,450 | B2 * | 12/2018 | Min ................... G01C 21/3492 |
| 2001/0029425 | A1 | 10/2001 | Myr |
| 2004/0225434 | A1 | 11/2004 | Gotfried |
| 2008/0319639 | A1 | 12/2008 | Yamane |
| 2010/0010734 | A1 | 1/2010 | Liu |
| 2010/0228469 | A1 | 9/2010 | Varadarajan |
| 2011/0037619 | A1 | 2/2011 | Ginsberg et al. |
| 2011/0040621 | A1 | 2/2011 | Ginsberg et al. |
| 2011/0095906 | A1 | 4/2011 | Stahlin |
| 2013/0245945 | A1 | 9/2013 | Morita et al. |
| 2013/0304367 | A1 | 11/2013 | Stehle et al. |
| 2014/0040032 | A1 | 2/2014 | Rowley et al. |
| 2014/0046581 | A1 | 2/2014 | Ota et al. |
| 2014/0336913 | A1 | 11/2014 | Fino |
| 2015/0088414 | A1 | 3/2015 | Mason et al. |
| 2015/0232026 | A1 | 8/2015 | Lueke et al. |
| 2015/0329107 | A1 | 11/2015 | Meyer et al. |
| 2016/0010998 | A1 | 1/2016 | Chia et al. |

OTHER PUBLICATIONS

International Search Report and Written Opinion to corresponding International Application No. PCT/US2017/020064 dated May 16, 2017.

* cited by examiner

SYSTEM AND METHOD OF NAVIGATION

CROSS-REFERENCE TO RELATED APPLICATIONS

This application is a continuation of, and claims the benefit of priority of, U.S. patent application Ser. No. 15/445,126 filed Feb. 27, 2017 titled "System and Method of Navigation" which claims priority to Chinese Application No. 201610116317.0, titled "Method and Apparatus for Navigation," filed on Mar. 1, 2016, both of which are hereby incorporated by reference in their entirety.

BACKGROUND

Field of the Disclosure

The disclosure relates to the field of computer software, and in particularly, to computer-based systems and methods of navigation.

Description of Related Art

Currently, when users of map services want to drive from a starting point to a destination point, map service providers will plan several routes for users to select based on the current traffic conditions and preferred settings of users (i.e., minimum time, shortest distance, avoiding traffic jams, etc.).

But the planning of routes by current map service providers fails to meet the needs of special situations. For example, in a situation where there are traffic lights, current map services only calculate transportation time based on current traffic information, and fail to consider variants such as when the user arrives at traffic lights. In another example, at certain points there may be no speed restriction in planned routes but, after an hour, the speed may be limited to 30 kilometers per hour due to certain circumstances such as large events.

Thus, current techniques for providing routes by map service providers provide incomplete driving recommendations without basing the provided routes on the prospective traffic conditions.

BRIEF SUMMARY

Embodiments of the disclosure provide apparatuses, systems and methods of navigation that remedy the problems caused by current map service providers, that is, the failure to consider future transportation conditions during navigation and when providing proposed routes.

In one embodiment, the disclosure describes a method for providing navigation. In this embodiment, the method comprises receiving a starting point and a destination from a user; calculating a plurality of routes between the starting point and the destination; receiving traffic information and traffic sign information associated with the plurality of routes; calculating transportation conditions during a set period of time in the future for each of the plurality of routes based on the traffic information and traffic sign information; selecting a recommended route from the plurality of routes based on the transportation conditions; and displaying the recommended route.

In another embodiment, the disclosure describes an apparatus for providing navigation. In this embodiment, the apparatus includes one or more processors; and a non-transitory memory storing computer-executable instructions therein that, when executed by the processor, cause the apparatus to: receive a starting point and a destination from a user; calculate a plurality of routes between the starting point and the destination; receive traffic information and traffic sign information associated with the plurality of routes; calculate transportation conditions during a set period of time in the future for each of the plurality of routes based on the traffic information and traffic sign information; select a recommended route from the plurality of routes based on the transportation conditions; and display the recommended route.

In the illustrated embodiments, by calculating the transportation condition during a set period of time in the future using transportation conditions, the embodiments have solved the problems caused by current solutions that fail to consider the transportation condition in the future during navigation and have significantly improved user experience.

BRIEF DESCRIPTION OF THE DRAWINGS

The drawings illustrated herein provide a further understanding to the disclosure and constitute a portion of the disclosure. Certain embodiments of the disclosure and descriptions thereof are used for further clarifying the disclosure and should not be construed as limiting the disclosure.

DETAILED DESCRIPTION

Figure 1:
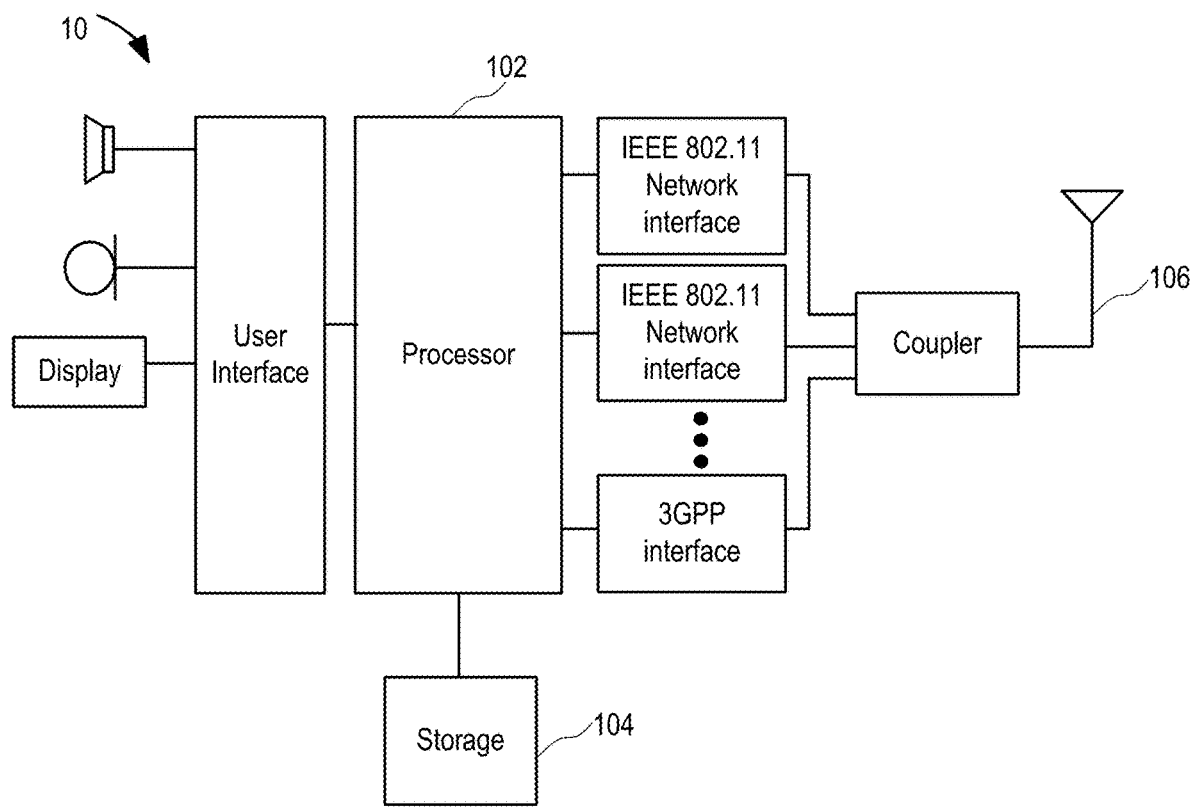
FIG. 1 is a block diagram of mobile terminal for providing navigation according to some embodiments of the disclosure.

In order to help a person skilled in the art have a better understanding of the disclosure, a clear and complete description about the technical solutions of the disclosure is provided with the drawings of embodiments of the disclosure. Based on embodiments of the disclosure, all the other embodiments achieved by those of ordinary skill in the art on condition that no inventive step is involved are within the protection scope of the disclosure.

It should be noted that terms such as "first", "second" in the claims and drawings above of the disclosure are used for distinguishing similar objects rather than defining a certain sequence. It shall be construed that numbers used in this way can be replaced by each other in suitable situations so that embodiments of the disclosure described herein can be implemented in sequences besides that given herein in the drawings and description. Furthermore, terms such as "comprise", "possess" and any of their variants are meant for covering non-exclusive inclusion, for example, processes, methods, systems, products and apparatuses comprising a series of steps or units are not necessarily limited to those explicitly given, but can also comprise implicitly-given steps or units that are inherent to those processes, methods, systems, products and apparatuses Embodiments of methods for providing navigation are provided according to embodiments of the disclosure disclosed herein. It should be noted that the steps shown by the flow diagrams may be implemented in, for example, computer systems where instructions can be implemented, which may be included in a group of computers. Although a sequence is shown by the working flow figure, in some circumstances, the steps can be implemented in different orders than the orders described herein.

FIG. 1 is a block diagram of mobile terminal for providing navigation according to some embodiments of the disclosure.

As is shown in FIG. 1, mobile terminal 10 may include one or more processor 102 (processor 102 may include, but is not limited to, processing devices such as an MCU or FPGA), storage 104 used for storing data, and transmit module 106 used for communication. The terminal illustrated in FIG. 1 is not intended to depict the physical structure of the terminal, but is only meant as a logical drawing. For example, mobile terminal 10 may also include more or less elements than those shown in FIG. 1, or possess a different configuration from that shown in FIG. 1. Storage 104 may store application software, such as the program instructions corresponding to the methods of navigation described herein. Processor 102 may implement various functional applications and conduct data processing by executing software programs stored in storage 104. Storage 104 may include high-speed Random Access Memory (RAM) or Non-volatile Memory (NVM), such as one or more magnetic storage devices, flash memory or other non-volatile solid-state memory. In some examples, storage 104 may further include storage devices that are remote to processor 102 and can be connected to mobile terminal 10 via a network. In these embodiments, the network may include, but is not limited in, the Internet, intranets, local area networks, mobile communication networks or a combination thereof.

Transmitting device 106 is used for receiving or transmitting data through a network. A network may include a wireless network provided by the supplier of communication of terminal 10. In one example, transmitting device 106 includes a Network Interface Controller (NIC), thereby connecting with other network devices through a base station so as to communicate with the Internet. In another example, transmitting device 106 can be a Radio Frequency (RF) module, thereby communicating with the Internet via a wireless medium. Device 106 may additionally include a GPS interface for receiving GPS coordinates.

The terminal shown in FIG. 1 may also be implemented as a computer terminal, and cloud computing platforms or other servers may also be viewed as being made up of one or more computer terminals. As discussed previously, the afore-mentioned operating environments may be utilized to provide a method of navigation.

Figure 2:
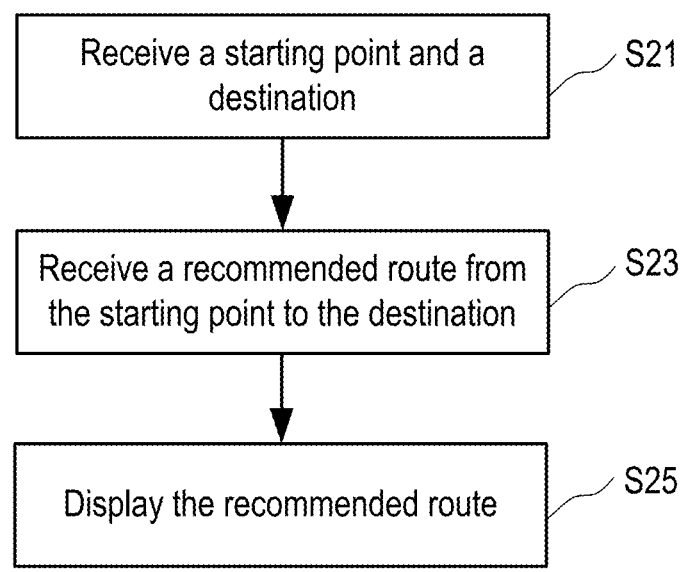
FIG. 2 is a flow diagram illustrating a method for providing navigation according to some embodiments of the disclosure.

FIG. 2 is a flow diagram illustrating a method for providing navigation according to some embodiments of the disclosure. In one embodiment, the method illustrated in FIG. 2 may be performed by mobile terminals, computer terminals or some other similar computing devices.

In step S21, the method receives a starting point and a destination.

In step S23, the method receives a recommended route from the starting point to the destination, wherein the recommended route is selected based on a transportation condition of one or more routes between the starting point and the destination and wherein the transportation condition of each route is a transportation condition during a set period of time in the future calculated from traffic information and traffic sign information of each route.

In step S25, the method displays the recommended route.

Through the aforementioned steps, the transportation condition of each route during a set period of time in the future is taken into consideration, which improves user experience and addresses the problems caused by current solutions that fail to consider the transportation condition in the future during the navigation.

In an alternative embodiment, a set period of time in the future is selected based on past experience. For example, in general situations, the period of time can be set as an hour, which may cover the driving time from a starting point to a destination for most users. In one embodiment, the duration of the period of time can be determined based on the city where the user is located, as described in the example below. Herein below is an explanation of one example.

Different cities generally differ in size and the duration of the period of time can be set based on sizes of cities. For example, City A may have a larger area and after surveying users' travel time, it can be found that the travel time in City A is no more than 1.5 hours for 80 percent of the users, hence the duration of the period of time for City A can be set as 1.5 hours. Likewise, City B may have a relatively smaller area, and after surveying users' travel time, it may be determined that the travel time in City B is no more than 0.5 hours for 80 percent of the users, hence the duration of the period of time for City B can be set as 0.5 hours. This method for determining the duration of the period of time has to collect user information and conduct settings based on it. Therefore, adjustments can also be adopted at any time based on the collected user information. For example, if statistics show that in January the travel time of users is no more than 1.5 hours, the duration of the period of time may be set as 1.5 hours; while in February the travel time of users is no more than 1 hour, hence the duration of the period of time may be set as 1 hour. Alternatively, or in conjunction with the foregoing, the method may determine the duration of the period of time based on the sizes of cities, f. For example, the maximum north-south distance in city A is 20 kilometers, the maximum west-east distance in city B is 40 kilometers, and it takes 40 minutes to cover 40 kilometers, hence the duration of the period of time can be set as 40 minutes. This embodiment takes only the size of city into consideration, and because the size of the city is basically fixed, the growth of vehicles within the city is excluded. Despite limitations, such a method can reasonably determine the travel time of users. Although the surveying method can flexibly adjust the set duration of users' travel time, because the user information has to be collected, such a method needs to win users' approval.

Alternatively, or in conjunction with the foregoing, the method may determine the duration of the period of time based on a starting point and a destination to obtain the travel time of other preceding users from the starting point to the destination, and then use the time as the duration of the period of time. For example, a user wants to leave for Park D from Plaza C, through searching he finds that another user once spent about 30 minutes to get to Park D from Plaza C, hence the duration of the period of time can be set as 30 minutes. Alternatively, the user himself once may have taken 40 minutes to get to Park D from Plaza C; hence the duration of the period of time can also be set as 40 minutes. Alternatively, or in conjunction with the foregoing, the method may determine the duration of the period of time based on the distance between Plaza C and Park D, thereby calculating the time needed to get to Plaza C from Park D based on the speed, and the duration of the period of time is set as the calculated time.

The above method may operate on terminals, which can be intelligent terminals such as mobile phones and tablets, etc. Terminals may also be vehicle terminals. The following example is provided herein using vehicle terminals as an example.

Users may input information of a starting point and a destination on vehicle terminals, and input settings for a set period of time. Next, the user may tap (or press keys on) the vehicle terminal to enter into the next display interface which displays recommended routes from the starting point to the destination for the user to choose.

After inputting the information of the starting point and the destination by users, vehicle terminals transmit the information of the starting point and the destination to the cloud computing platform if computing is needed there. After the cloud computing platform finishes the computing, the results are transmitted to the vehicle terminal.

When the vehicle bearing the terminal is in motion, it can receive its position through location protocols, such as GPS, in order to determine whether the vehicle is in motion along the recommended route. If there is deviation, the present position of the vehicle will get transmitted to the cloud computing platform where computing is conducted again. Emergencies (i.e., traffic congestion, change of traffic lights, etc.) may take place on the route where the vehicle is in motion, which results in the transportation condition deviating from the predicted condition. If such emergencies occur, the cloud computing platform may modify the instructions again and transmit new instructions to the vehicle terminal.

All in all, vehicle terminals and the cloud computing platform function in an interactive way in real time, so as to adjust the driving route at any time and enable a better driving experience.

In an alternative embodiment, in order to further improve the driving experience, the driver may choose routes that can directly lead through traffic lights from the recommended routes displayed on vehicle terminals as practical driving routes without stopping at traffic lights. Specifically, when drivers choose an actual driving route from recommended routes displayed on vehicle terminals, the actual driving route and position in the route can be determined to inform users of a first speed, wherein the first speed is the speed at which a vehicle approaches a next traffic light, enabling the vehicle to pass directly through upon its arrival. In this embodiment, the user driving his vehicle the entire time on the chosen actual route at the first speed may be called the non-stopping model.

According to the preceding embodiments, utilizing the first speed informed by vehicle terminals, drivers can directly pass through each traffic light in the route without stopping, so that the vehicle can remain in motion.

Traffic information may include: real time traffic information, or traffic information during a set period of time predicted based on the real time traffic information and history; and/or, traffic sign information comprising at least one of traffic light information, road marking information and information of unexpected situations taking place on the road. The traffic light information may be that of red-green lights, for example, information of their ratio, and length of time for each. The road marking information may be classified as time-phased traffic control information or all-time traffic control information which is planned in real time, and time-phased traffic control information or all-time traffic control information which is predicted for a set period of time. The information of unexpected situations taking place on the road may be classified as real time information and predicting information of accident addressing signs with traffic accidents.

Traffic information for a set period of time can be obtained from two resources. First, the traffic information during a set period of time in the future can be predicted based on current real-time traffic information by utilizing existing modeling patterns and predicting methods. Second, the traffic information during a set period of time in the future can be predicted based on current real-time traffic information and past traffic information (the above-mentioned history of traffic information) by utilizing existing modeling patterns and predicting methods.

In the above mentioned examples of the disclosure, the transportation condition of each route during a set period of time in the future can be determined based on traffic information and traffic signs information of each route between a starting point and a destination, and a recommended route between the starting point and destination can be received based on the transportation condition. Users can choose an actual driving route from recommended routes displayed on the interface on terminals, and on the actual route, users can drive at the first speed to pass through traffic lights directly without stopping. That is, users can arrive to the destination punctually and safely while keeping the vehicle in motion the entire time. Thereby, improving user experience of navigation.

Figure 3:
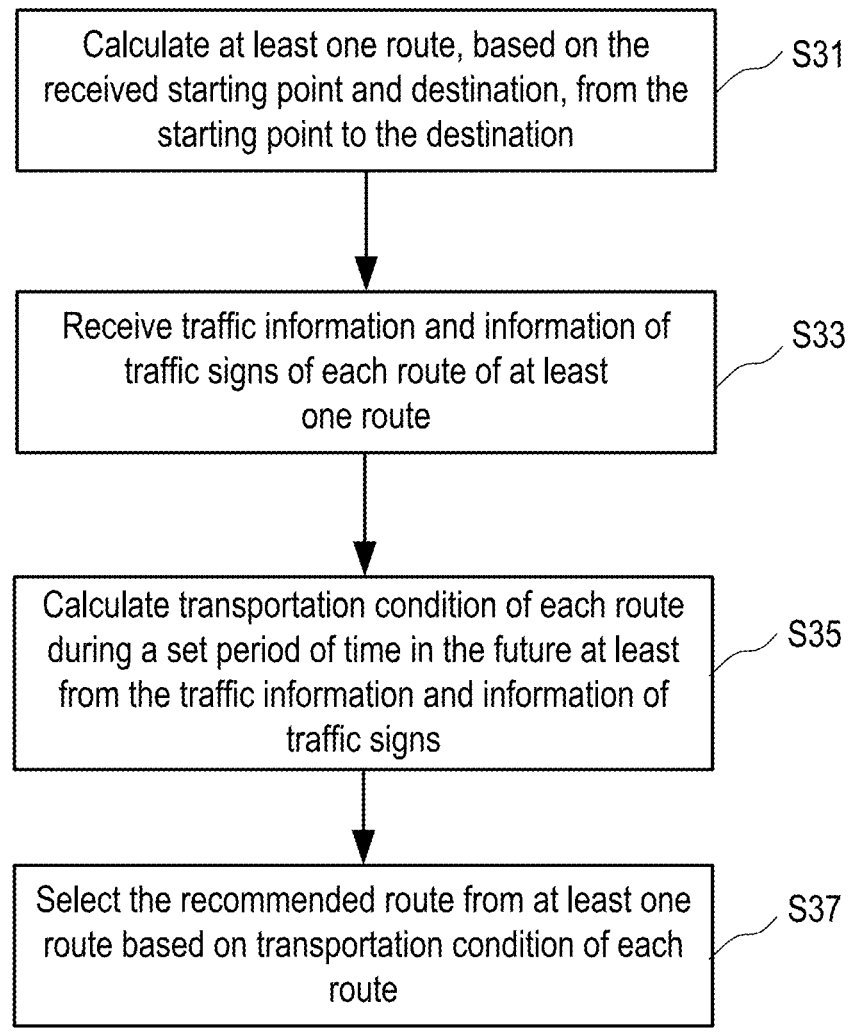
FIG. 3 is a flow diagram illustrating a method for providing navigation according to some embodiments of the disclosure.

FIG. 3 is a flow diagram illustrating a method for providing navigation according to some embodiments of the disclosure.

In step S31, the method calculates at least one route from a starting point to a destination based on a received starting point and a received destination.

In step S33, the method receives traffic information and traffic sign information of each route of the at least one route.

In step S35, the method calculates a transportation condition of each of the roads during a set period of time in the future from at least the traffic information and the traffic sign information.

In step S37, the method selects a recommended route from at least the transportation condition of each route from the at least one route.

As illustrated above, the transportation condition of each route during a set period of time in the future is taken into consideration, which improves user experience and addresses the problems caused by current solutions that fail to consider the transportation condition in the future during navigation.

In an alternative embodiment, a set period of time in the future is selected based on past experience. For example, in general situations, the period of time can be set as an hour, which may cover the driving time from a starting point to a destination for most users. In one embodiment, the duration of the period of time can be determined based on the city where the user is located, as described in the example below.

Different cities generally differ in size and the duration of the period of time can be set based on sizes of cities. For example, City A may have a larger area, and after surveying users' travel time, it can be found that the travel time in City A is no more than 1.5 hour for 80 percent of the users, hence the duration of the period of time for City A can be set as 1.5 hours. Likewise, City B may have a relatively smaller area, and after surveying users' travel time, it may be determined that the travel time is no more than 0.5 hours for 80 percent of the users, hence the duration of the period of time for City B can be set as 0.5 hours. This method for determining the duration of the period of time has to collect user information and conducts setting based on it. Therefore, adjustments can also be adopted at any time based on the collected user information. For example, if statistics show that in January the travel time of users is no more than 1.5 hours, the duration of the period of time may be set as 1.5 hours; while in February the travel time of users is no more than 1 hour, hence the duration of the period of time may be set as 1 hour. Alternatively, or in conjunction with the foregoing, the method may determine the duration of the period of time based on the sizes of cities. For example, the maximum north-south distance in city A is 20 kilometers, the maximum west-east distance in city B is 40 kilometers, and it takes 40 minutes to cover 40 kilometers, hence the duration of the period of time can be set as 40 minutes. This embodiment takes only the size of city into consideration, and because the size of city is basically fixed, the growth of vehicles within the city is excluded. Despite limitations, such a method can reasonably determine the travel time of users. Although the surveying method can flexibly adjust the set duration of users' travel time, because the user information has to be collected, such a method needs to win users' approval.

Alternatively, or in conjunction with the foregoing, the method may determine the duration of the period of time based on a starting point and a destination to obtain the travel time of other preceding users from the starting point to the destination, and then use the time as the duration of the period of time. For example, a user wants to leave for Park D from Plaza C, through searching he finds that another user once spent about 30 minutes to get to Park D from Plaza C, hence the duration of the period of time can be set as 30 minutes. Alternatively, the user himself once may have taken 40 minutes to get to Park D from Plaza C; hence the duration of the period of time can also be set as 40 minutes. Alternatively, or in conjunction with the foregoing, the method may determine the duration of the period of time based on the distance between Plaza C and Park D, thereby calculating the time needed to get to Plaza C from Park D based on the speed, and the duration of the period of time is set as the calculated time.

The above method may operate on a server, which can be a cloud server, that is, a cloud computing platform.

In another embodiment, the cloud computing platform collects information of the starting point and destination input by the users, from vehicle terminals for transmitting and receiving data, and queries the real time route planning service to determine several routes to choose. After several routes are determined, the cloud computing platform may receive traffic information of each candidate route during a set period of time in the future through the traffic forecasting module, that is, it may receive the number of vehicles in motion on each candidate route, speed of each vehicle, and congestion condition of each candidate route; it may also receive the number of traffic signs and traffic sign information of each candidate route, the transportation condition of each candidate route during a set period of time in the future can be determined through the cloud computing platform, for example, transportation time of each candidate route and at least one speed when considering traffic sign information can be determined. Based on the transportation condition of each candidate route, the cloud computing platform selects at least one route from the candidate routes as the recommended route and displays it on the vehicle terminal for the user.

Figure 4:
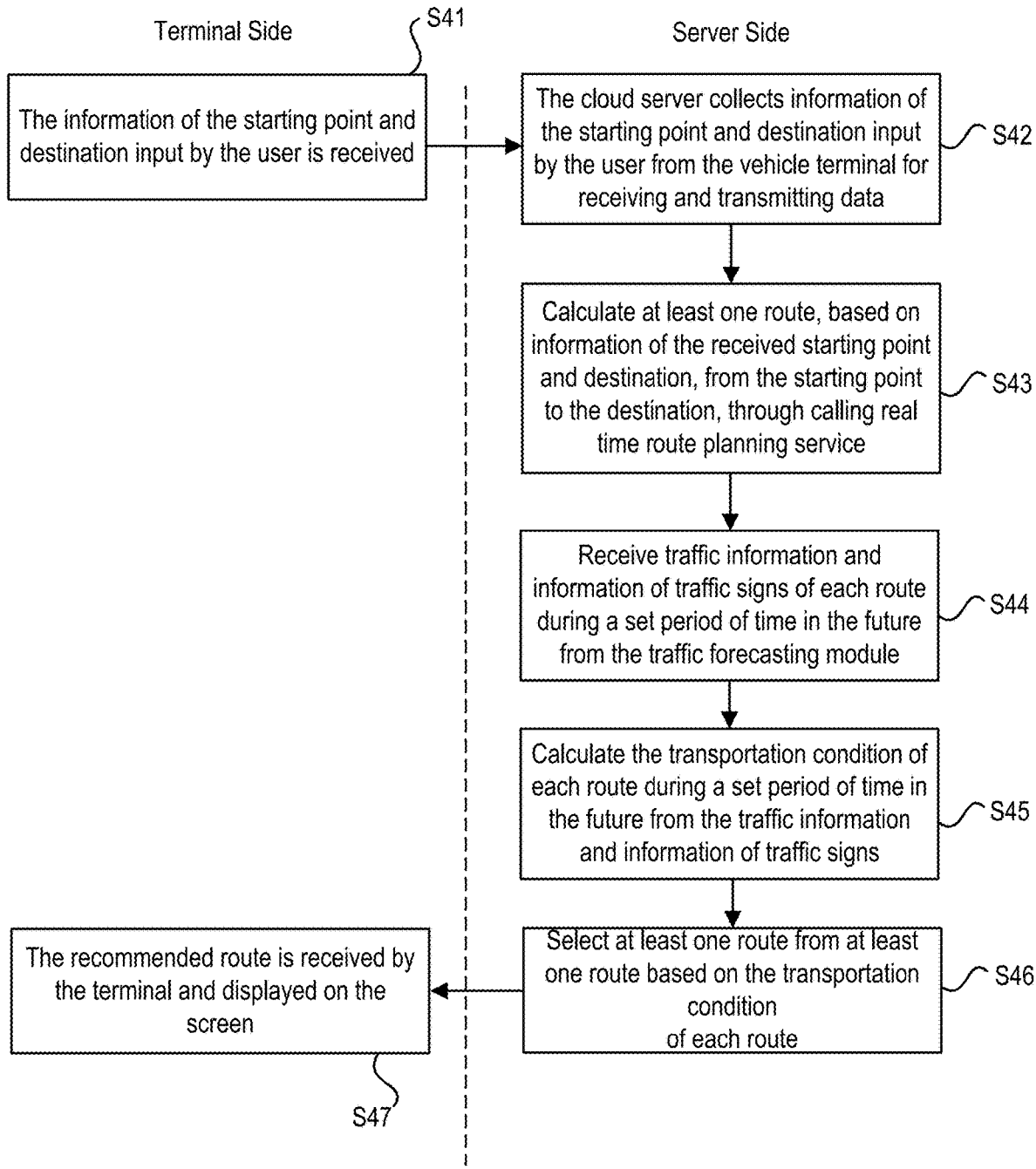
FIG. 4 is a flow diagram illustrating a method for providing navigation according to some embodiments of the disclosure.

FIG. 4 is a flow diagram illustrating a method for providing navigation according to some embodiments of the disclosure.

In step S41, the method receives information defining a starting point and destination input by the user. In one embodiment, input by a user may be conducted at a terminal.

In step S42, the method, via a cloud computing platform, collects the starting point and destination information input by users, from vehicle terminals configured to transmit and receive data. In some embodiments, in step S42, a cloud computing platform may receive the starting point and destination information input by users.

In step S43, the method calculates at least one route between the starting point and the destination based on the received the starting point and destination information and by calling a real time route planning service.

In step S44, the method receives traffic information and traffic sign information during a set period of time in the future from a traffic forecasting module.

In steps S41 through S44, the number of vehicles in motion on each route, the speed of each vehicle and the congestion condition of each route during a set period of time in the future may be received. Alternatively, or in conjunction with the foregoing, the number of traffic signs and traffic sign information of each route may also be received.

In step S45, the method calculates the transportation condition of each route during a set period of time in the future based on the received traffic information and traffic sign information. For example, transportation time of each route and at least one speed when considering traffic sign information can be determined.

In step S46, the method selects at least one route shall as a recommended route based on the transportation condition of each route.

In some embodiments, steps S42 through S46 may be completed by a cloud server.

In step S47, the terminal receives the recommended route and displays it on the screen.

In the illustrated embodiment, the terminal and the cloud server function in an interactive way, the terminal transmits the received information of the starting point and destination, traffic information of each route between the starting point and the destination, and traffic sign information to the cloud server. The cloud server then calculates the transportation condition of each route during a set period of time in the future based on above-mentioned information and determines at least one recommended route. The terminal displays the recommended route received by the cloud server to the user on its screen for the user to choose.

In an alternative embodiment, when the user selects a route from the at least one recommended route displayed on the terminal and is in motion, if real time driving information (i.e., speed of the vehicle) and real time traffic sign information (i.e., accident addressing signs with traffic accidents) do not match the forecasting, then the cloud platform will determine several recommended routes again based on received traffic information and traffic sign information at that moment, so that the user can select again.

In an alternative embodiment, the transportation condition comprises transportation time which can represent a type of transportation condition, in such way the transportation time of each route during a set period of time in the future is calculated based on traffic information and traffic light information of the traffic sign information of each route, so as to determine the route to choose.

As an example, a driver may leave for a destination, Plaza N, from a starting point, Community M, at 7:00 a.m. The driver can input information of the starting point and destination where the starting point is marked as A and the destination is marked as B, and use the 30 minutes that it took for him or her to get to Plaza N from Community M during a previous trip as a set time frame. The cloud computing platform determines three candidate routes based on information of the starting point and destination input by the user, and calculates the transportation condition of each route during the time frame of 7:00 a.m. to 7:30 a.m. based on traffic information and traffic sign information of each candidate route. If the transportation condition of each candidate route is evaluated based on transportation time, then the cloud computing platform will select, from three candidate routes, a route with minimum transportation time as the recommended route based on transportation time of each route, and output the recommended route via display of the terminal for the driver to see.

Traffic light information is an important component of the traffic sign information, however, traffic sign information may also comprise other information such as road communication marking lights. Provided below is an example using traffic light information.

Traffic light information may comprise the information of the ratio of red to green lights, for example, the red-state as the first duration (i.e., 60 s), the green-state as the second duration (30 s). Take a vehicle approaching a traffic light as an example: if the traffic light is red when the vehicle is approaching, then the vehicle has to wait only until the red state of 60 seconds has ended, then it may continue. If the traffic light is green when the vehicle is approaching, then the vehicle can pass directly through as long as the green state of 30 seconds has not yet ended.

If information related to traffic lights is calculated by the cloud computing platform, then after receiving several candidate routes, the cloud computing platform may receive the number of vehicles in motion on each candidate route, speed of each vehicle and congestion condition of each candidate route during a set period of time in the future from the traffic forecasting module. It may also receive information such as the number of traffic lights, the ratio of red to green lights of each candidate route. Based on the received traffic information and traffic light information, the cloud computing platform may calculate transportation time of each candidate route during a set period of time in the future, and select at least one route from the candidate routes as the recommended route based on the transportation time of each candidate route and present it to the user via a display of the vehicle terminal.

As illustrated above, traffic light information is analyzed and the recommended route may be determined (and received by a terminal) based on the calculated transportation time of each candidate route during a set period of time. This method can determine the recommended route based on transportation time, enabling the user to save time, drive safely and get to the destination on time.

During calculation of transportation time of a route, in order to comparatively simplify the calculation, certain embodiments may take into consideration the fact that a route is divided into several sections. That is, in other embodiments, each route may be divided into at least one section and speed for passing through each section of the route at least based on traffic information of each route may be calculated. Next, a transportation time for passing through a section based on the speed for passing through each section may be calculated and a time for passing through traffic lights of each route respectively based on traffic light information may be calculated. Finally, a time for passing through each route based on the time for passing through traffic lights and the time for passing through all the sections of the route may be calculated. These embodiments are discussed more fully with respect to FIG. 5.

Figure 5:
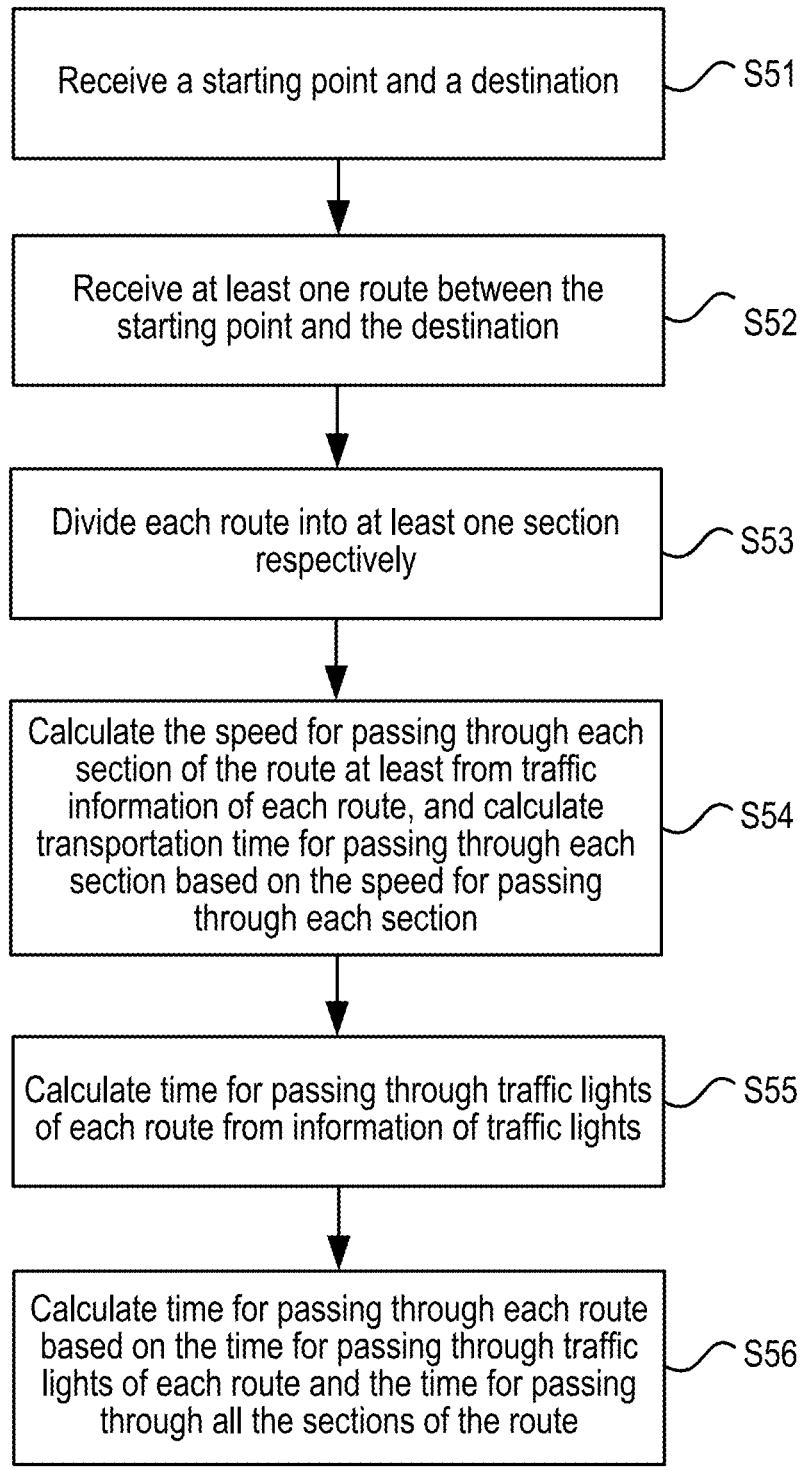
FIG. 5 is a flow diagram illustrating a method for providing navigation for a plurality of route sections according to some embodiments of the disclosure.

FIG. 5 is a flow diagram illustrating a method for providing navigation for a plurality of route sections according to some embodiments of the disclosure.

In step S51, the method receives a starting point and a destination.

In step S52, the method receives at least one route between the starting point and the destination.

In step S53, the method divides each route into at least one section.

Steps S51 through S53 may be performed by a server. For example, the cloud computing platform may split each route into fine-grained sections comprising at least one that is applied in the traffic forecasting module through correlation with an invoker servlet for forecasting future traffic of the sections. The method for dividing a route may also vary. For example, a route can be divided into at least one section through the following three methods: first, divide each route into at least one section based on turns (right turns or left turns) of each route; second, based on the number of traffic lights of each route, named as L, divide each route into sections of L+1; and third, calculate the total length of each route, based on the principle of average distribution, divide each route into at least one section.

In step S54, the method calculates a speed for passing through each section of the route at least based on traffic information of each route and calculates a time for passing through the section based on the speed for passing through each section. It should be noted that traffic information of at least one section during a set period of time in the future after the division of each route can be read from the traffic forecasting module, and based on the traffic information, a speed for passing through each section can be calculated, so transportation time frame within each section, that is, the transportation time for passing through each section, can be calculated with the length of each section.

In step S55, the method calculates a time for passing through traffic lights of each route respectively based on traffic light information.

In one embodiment, each route comprises a number of traffic lights (discussed above) and each traffic light may be associated with a pattern of the ratio of red to green lights.

Under the condition where each traffic light has the same ratio (i.e., the first time frame where the lights stay red is longer than the second time frame where the lights stay green and the ratio between the two time frames is the first ratio), the time for passing through traffic lights of each route can be obtained through calculating the time for the vehicle to pass through each traffic light.

For example, if a route has five traffic lights, the vehicle has to wait only until lights turn green upon its arrival can pass through, hence time for passing through traffic lights of the route can be determined by calculating the time spent waiting at each traffic light. In this embodiment, the vehicle passes through each traffic light when approaching, that is, the lights stay green so the vehicle does not have to stop, then in such a situation, the time for passing through traffic lights of the route is approximately zero.

In step S56, the method calculates transportation time for passing through each route based on the time for passing through traffic lights of each route and the time for passing through all the sections of the route.

As illustrated above, the method for dividing each route into at least one section may be used and transportation time for passing through each route can be determined more accurately, so as to recommend more convenient and time-saving routes to the user, thereby improving user experience of navigation. In some situations, if the user can directly pass through traffic lights every time without stopping, then the driver may have a comparatively better experience. However, there must be a speed control in this situation to ensure an arrival at traffic lights at a proper speed.

In order to achieve this, at least one first speed may be calculated based on traffic information of each route, wherein the first speed is the speed at which the vehicle approaches a traffic light. The speed can enable the vehicle to pass through the traffic light directly upon arrival by calculating a transportation time for passing through the route during a set period of time based on at least one first speed.

Similarly, a server can calculate the first speed. For example, the cloud computing platform may break each route into fine-grained sections comprising at least one that is applied in the traffic forecasting module, through correlation with an invoker servlet for forecasting future traffic of the sections. Next, the cloud computing platform may calculate the speed (the first speed mentioned above) that can enable the vehicle to pass through each traffic light directly, based on traffic information of at least one section during a set period of time after a route is divided and traffic light information of each route. In this embodiment, a corresponding first speed can be calculated based on information of the current section and information of the current traffic light when approaching the traffic light.

In the above-mentioned solution, the user driving his vehicle the entire time on the selected actual route at the first speed may be called a non-stopping mode. A switch can be added for the non-stopping mode, so that the user can choose to use it or not.

Through the above-mentioned embodiment, the user can pass directly through each traffic light of the route without stopping by utilizing the calculated first speed, so that the user can arrive safely and punctually to the destination while maintaining motion the entire time along the route. However, the user may not be able to drive at the maximum speed when directly passing through traffic lights, in such a situation, another embodiment may be utilized.

In one embodiment, in the situation that each route is divided into at least one section with traffic lights as boundaries, calculating the traffic time for passing through the route during the set period of time from at least one first speed comprises: calculating the first time when passing through each section of the route at, at least one, the first speed; calculating a highest speed for passing through each traffic light of the route and transportation time when approaching each traffic light at the highest speed from the traffic information, and adding the transportation and time spent on waiting at traffic lights to figure out a second time for passing through each section; comparing the first time and the second time of each section, and calculating the minimum transportation time for passing through each route.

Continuing the cloud computing platform conducting calculation example, a method may break each route into at least one section in the traffic forecasting module with traffic lights as boundaries. Through correlation with an invoker servlet for forecasting future traffic of the sections, the cloud computing platform can calculate the speed that enables the vehicle to pass through each traffic light, based on traffic information of at least one section after each route is divided during a set period of time and traffic light information of each route, wherein the first speed that can enable the vehicle to pass through traffic lights directly can be calculated based on traffic information of each section and corresponding traffic light information during a set period of time in the future. Next, the method may divide a route into sections with traffic lights as boundaries, each section corresponds to a first speed, calculate time (the first time mentioned above) for passing each section based on the first speed. Then, the method may calculate the maximum speed when approaching the traffic light corresponding to each section and transportation time spent before approaching the traffic light corresponding to each section at the maximum speed based on traffic information of each route after division. Finally, the method may calculate the sum of the transportation time and time spent in stopping at traffic lights and use the sum as the second time for passing through each section.

Furthermore, in some embodiments, the method may compare the first time and the second time of the each section to determine a minimum time for passing through each section and calculate minimum transportation time for passing through each route. This means that the user can pass through each section at a speed (the maximum speed or the first speed) corresponding to the minimum time. That is, the user can drive at the first speed in some sections and the maximum speed in the rest of the sections, so as to arrive at the destination with minimum transportation time spent.

Through the above-mentioned embodiment, by combining the two solutions of both the speed and the maximum speed, minimum time for passing each route can be determined, so as to provide the user with a driving plan of better convenience and safety and thereby improve user experience of navigation.

Traffic information of the above-mentioned embodiment comprises: real time traffic information, or traffic information during a set period of time, predicted based on the real time traffic information and history of traffic information. Traffic sign information may comprise at least one of the following: traffic light information, road marking information and information of unexpected situations taking place on the road. The traffic light information may be information of red and green lights, for example, information of the ratio of red and green lights, time frame for when lights stay red and time frame for when lights stay green; road marking information may be classified as time-phased traffic control information or all-time traffic control information which is planned in real time, and time-phased traffic control information and all-time traffic control information during a forecasting set period of time; information of unexpected situations taking place on the road can be classified as real time information and forecasting information of accident addressing signs with traffic accidents.

The above-mentioned embodiments may be implemented in the traffic forecasting module. The traffic information during a set period of time in the future can be predicted based on current real-time traffic information by utilizing existing modeling patterns and predicting methods. Alternatively, the traffic information during a set period of time in the future can be predicted based on current real-time traffic information and past traffic information (the above-mentioned history of traffic information) by utilizing existing modeling patterns and predicting methods.

Figure 6:
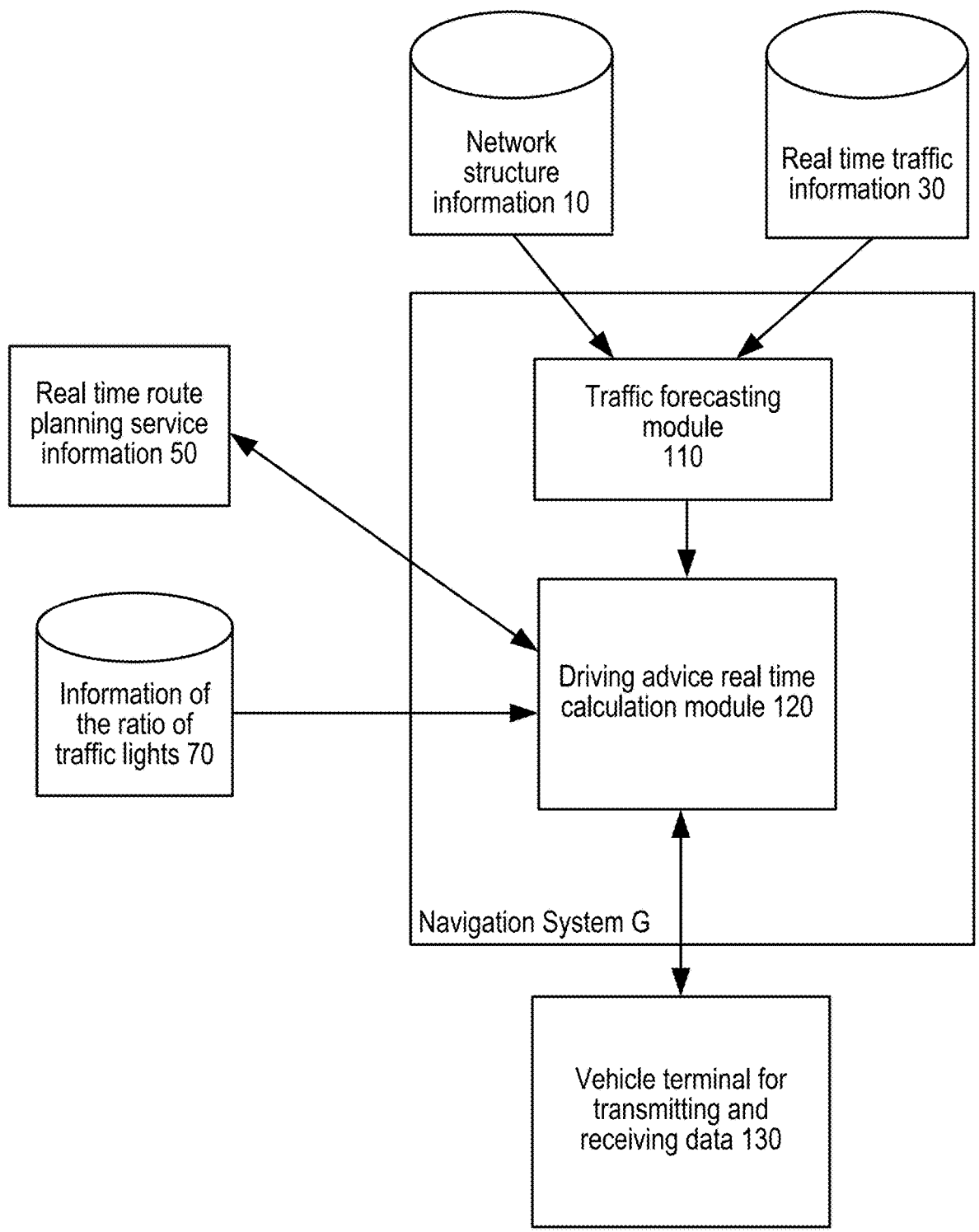
FIG. 6 is a block diagram illustrating shows a navigation system according to some embodiments of the disclosure.

FIG. 6 is a block diagram illustrating shows a navigation system according to some embodiments of the disclosure. As illustrated, the navigation system comprises:

Inputs modules comprise information of road network structure database 10, real time traffic data database 30, real time route planning service information 50 and ratio of traffic lights 70.

In one embodiment, the information of road network structure 10 comprises regularly updated information of a route network structure database. In one embodiment, the real time traffic data 30 is the currently given real time traffic information. In one embodiment, the real time route planning service information 50 is the real time route planning service information provided by the Internet map service provider, In one embodiment, the information of the ratio of traffic lights 70 is the overall information of the ratio of traffic lights during a period of time in the future, such as the information of the ratio of red and green lights in the next 60 seconds, that is, the first duration (i.e., 60 s) when lights stay red and second duration (30 s) when lights stay green.

Processing modules comprise a traffic forecasting module 110 and a driving advisor real time calculation module 120.

In one embodiment, the traffic forecasting module 110 forecasts traffic information (the transportation condition of routes) during a set period of time in the future, based on existing modeling patterns and predicting methods and based on input information of route network structure, real time traffic data (present real time traffic data) and past traffic condition data.

In one embodiment, the driving advisor real time calculation module 120 responds to requests by vehicles for planning routes, examines the transportation condition during a set period of time in the future of a number of possible routes (the candidate routes mentioned above), and calculates the recommended route and speed for the driver.

It should be noted that the illustrated embodiment also comprises an output module: a vehicle terminal for receiving and transmitting data 130.

In one embodiment, the vehicle terminal for receiving and transmitting data 130, on one hand, will upload related parameters to the navigation system and, on the other hand, will display the calculation results of the driving advisor real time calculation module through the vehicle terminal and display information about the recommended route and speed to the user.

In the illustrated embodiment, the navigation system comprises a traffic forecasting module and a driving advisor real time calculation module. The traffic forecasting module determines traffic information during a set period of time in the future, based on input information of route network structure, real time traffic data and past traffic data, utilizing existing modeling patterns and predicting methods. The driving advisor real time calculation module determines the recommended route and speed for the user through the input real time route planning service information, information of the ratio of traffic lights and traffic information during a set period of time in the future calculated by the traffic forecasting module. The vehicle terminal for receiving and transmitting data displays information of the recommended driving route and speed determined by the driving advisor real time calculation module to the user.

Figure 7:
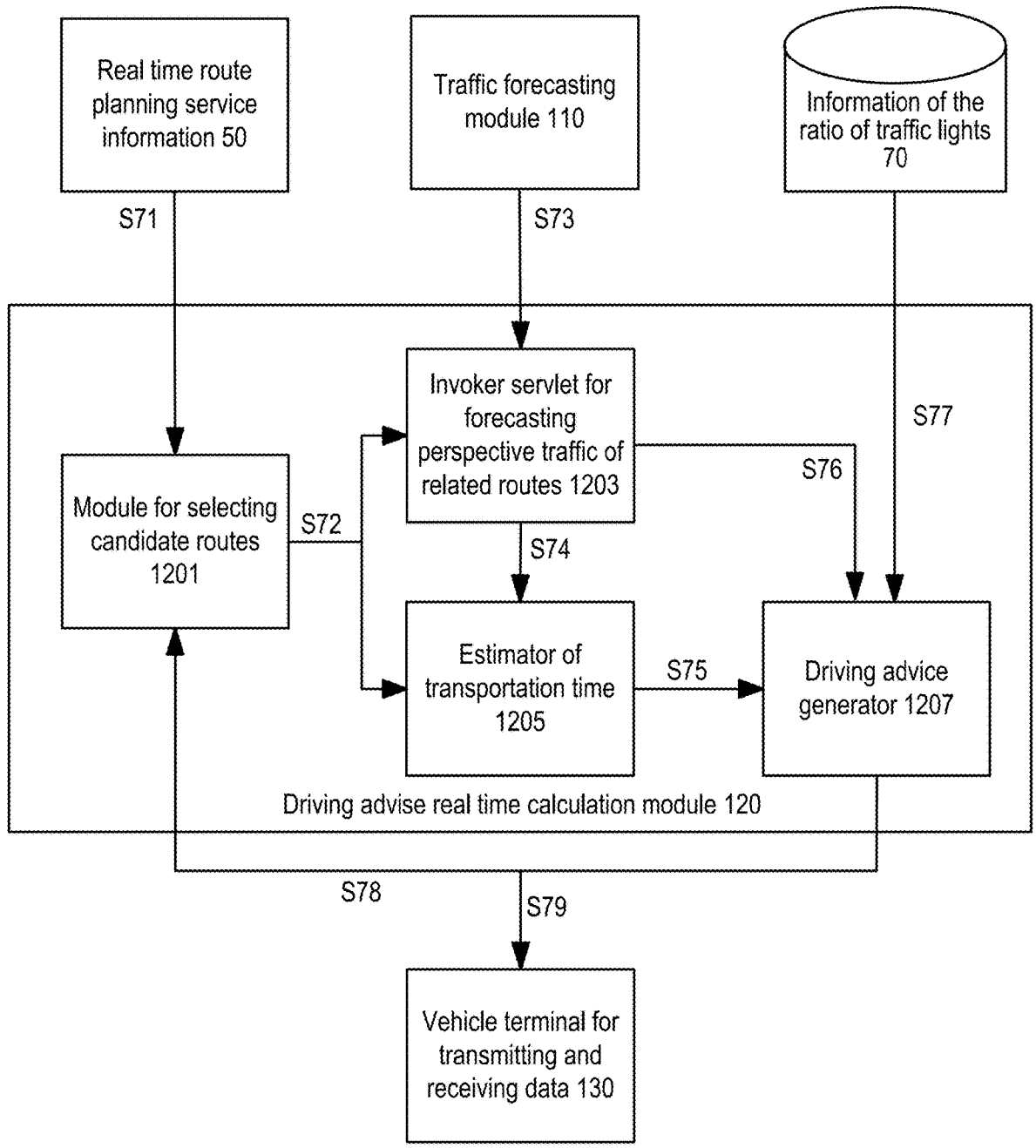
FIG. 7 is a block diagram illustrating a system for providing navigation according to some embodiments of the disclosure.

FIG. 7 is a block diagram illustrating a system for providing navigation according to some embodiments of the disclosure.

As is shown in FIG. 7, the driving advisor real time calculation module 120 of the embodiment comprises: a module for selecting candidate routes 1201, an invoker servlet for forecasting perspective traffic of related routes 1203, an estimation servlet of transportation time 1205 and a driving advice generator 1207. The function of each module in the embodiment can be achieved through the following steps:

Step S71: determining at least one candidate route based on the input real time route planning service information and storing it into the module for selecting candidate routes.

Step S72: transmitting information of at least one route to the invoker servlet for forecasting perspective traffic of related routes.

In one embodiment, each candidate route is divided into at least one fine-grained section applied in the traffic forecasting module through the invoker servlet for forecasting perspective traffic of related routes.

Step S73: reading information of at least one section during a set period of time in the future, after the division of each route, from the traffic forecasting module.

Step S74: transmitting traffic information of each section during a set period of time in the future to the estimation servlet of transportation time.

In one embodiment, a speed for passing through each section can be calculated through the estimation servlet of transportation time, and in association with the length of each section, transportation time of each section. That is, the time for passing through each section can be calculated, and the moments when entering and leaving each section can be calculated.

Step S75: transmitting information about speed and transportation duration of each section to the driving advice generator.

Step S76: transmitting traffic information of each section during a set period of time in the future to the driving advice generator.

Step S77: transmitting information of the ratio of traffic lights to the driving advice generator.

In one embodiment, the driving advice generator takes the information of the ratio of traffic lights into consideration, it determines transportation time of a number of candidate routes in association with traffic information of each section during a set period time in the future, and it selects the recommended driving route and speed of each section for the user from the candidate routes.

Embodiments where the transportation time of a number of candidate routes is determined through the aforementioned steps has been discussed previously, and the details of such determination are not repeated herein for the sake of clarity.

Step S78: transmitting information about the recommended route and speed for passing through each section to the module for selecting routes.

Through this step, information of the present recommended route can be taken as information of candidate routes when conducting the calculation of the recommended route in real time for the next time.

Step S79: transmitting information about the recommended route and speed for passing through each section to the vehicle terminal for receiving and transmitting data.

In one embodiment, the information about the recommended route and speed for passing through each section is presented to the user via the display of the vehicle terminal for transmitting and receiving data.

In the illustrated embodiment, a solution for providing vehicles with driving advice is generated based on traffic information and traffic light information on the cloud platform. The solution introduces information of the ratio of traffic lights, perspective traffic forecasts and estimates of arrival time based on forecasting traffic, accurately takes into account the influence traffic lights have on traffic, adopts the forecasting traffic and estimates of arrival time based on forecasting traffic as inputs to calculate the recommended route and speed for passing through the route, and provides real time adjustments of driving advice based on the traffic. Therefore, through the solution, information of the ratio of traffic lights is taken into consideration, and through calculating traffic during a set period of time in the future, it improves user experience and addresses the problems caused by current solutions that fail to consider the transportation condition in the future during navigation.

Figure 8:
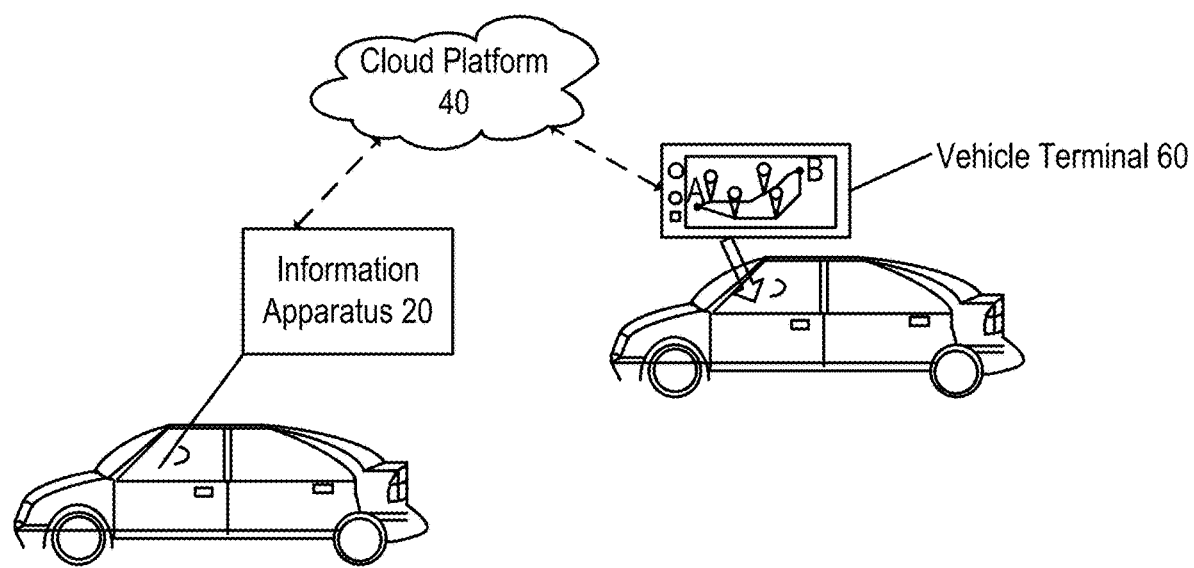
FIG. 8 is a diagram illustrating a system for providing navigation to a vehicle terminal according to some embodiments of the disclosure.

FIG. 8 is a diagram illustrating a system for providing navigation to a vehicle terminal according to some embodiments of the disclosure.

The illustrated system comprises: an information apparatus 20, a cloud platform 40 and a vehicle terminal 60.

The information apparatus 20 can be construed as a mobile terminal or an intelligent terminal while the information apparatus can be carried by the vehicle owner and can be placed in the vehicle while in motion.

Depending on the capabilities of the apparatus, the information apparatus 20 may also receive current traffic information while in motion, information of route network structure, real time route planning service information and information of the ratio of traffic lights. The information apparatus 20 may also transmit this information to the cloud platform 40. The cloud platform 40 determines a number of recommended routes during a set period of time in the future based on this information. After which, a number of recommended routes (two recommended routes between the starting point A and the destination B are marked in FIG. 8 in vehicle terminal 60) are displayed on the screen of the information apparatus 20 for the driver to choose. Specifically, the cloud platform determines traffic information during a set period of time in the future based on current traffic information (including real time traffic information and past traffic data), information of route network structure, utilizing existing modeling patterns and forecasting methods, and it determines information of the recommended routes and speed for passing through the route in association with real time route planning service information and information of the ratio of traffic lights.

In alternative embodiments, the functions of the information apparatus 20 may also be performed by vehicle terminal 60.

It should be noted that, each of the examples mentioned above is expressed as a series motion combination for the purpose of describing in a simple way, but a person skilled in the art shall understand that the disclosure is not restricted by the sequence of the described motions, because based on the disclosure, some of the steps can be conducted in other sequences or simultaneously. Secondly, the person skilled in the art shall also understand that embodiments of the description are all preferred embodiments, the motions and modules concerned are not necessarily indispensable with disclosure.

Through the description of embodiments above, the person skilled in the art can clearly know that methods according to above-mentioned embodiments can be achieved assisted by software and necessary general hardware platforms, certainly the methods can be achieved by hardware, but in most cases, the former is better. Based on such an understanding, technical solution of the disclosure in nature, or in other words, its contribution to existing technologies can be presented in the form of software products, the computer software product is stored in a memory medium (ROM/RAM, diskette and disk). Comprising a number of instructions enabling a terminal device (mobile phone, computer, server, or network apparatus) that implements the methods described in the embodiments of the disclosure.

In one embodiment, the methods illustrated in FIGS. 1 and 2 (including alternative embodiments) may be implemented in terminals, while the methods illustrated in FIGS. 3 through 8 (including alternative embodiments) may be implemented in servers. Certainly, with the development of technology, computing capability of terminals is growing more powerful, so as to achieve the methods of illustrated in FIGS. 3 through 8 (including alternative embodiments). Alternatively, or in conjunction with the foregoing, an option of offline maps can be added wherein users can download all the necessary data to terminals before use, and then implement the methods illustrated above (including alternatives). Certainly, it can be determined based on actual needs to adjust between the steps that are implemented in terminals and those implemented in servers. Furthermore, the units and modules of the following embodiments may also be adjusted based on actual needs to determine whether they should be implemented in terminals or servers.

Figure 9:
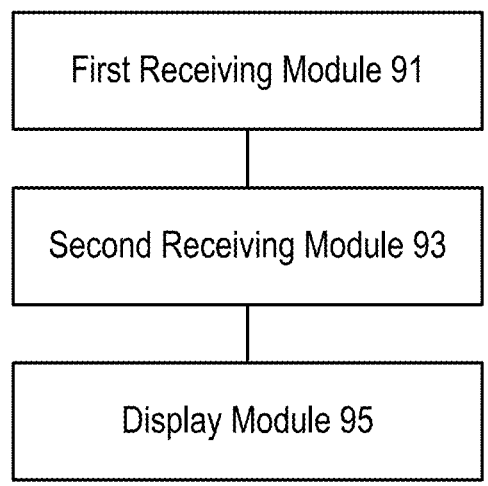
FIG. 9 is a block diagram of an apparatus for providing navigation according to some embodiments of the disclosure.

FIG. 9 is a block diagram of an apparatus for providing navigation according to some embodiments of the disclosure. In the illustrated embodiment, the apparatus includes a first receiving module 91, a second receiving module 93, and a display module 95. In one embodiment, the apparatus of FIG. 9 may be configured to implement the methods discussed in connection with FIGS. 1 through 2.

In one embodiment, first receiving module 91 is used for receiving a starting point and a destination;

In one embodiment, second receiving module 93 is used for determining a recommended route between the starting point and the destination, where the recommended route is determined based on the transportation condition of each route between the starting point and the destination, the transportation condition of each route is the transportation condition during a set period of time in the future calculated based on traffic information and traffic sign information of each route.

In one embodiment, the display module 95 is used for displaying the recommended route.

Through the above-mentioned modules, the transportation condition of each route during a set period of time, and problems caused by current solutions that fail to consider the transportation condition in the future during navigation have been solved, thereby improving user experience of navigation.

In an alternative embodiment, a set period of time in the future is selected based on past experiences. For example, in general situations, the period of time can be set as an hour, which may cover the driving time from a starting point to a destination for most users. In one embodiment, the duration of the period of time can be determined based on the city where the user is located. Examples are already given in connection with FIGS. 1 through 2, the details of which are not repeated herein for the sake of clarity.

The illustrated apparatus may operate as a server, which may also be an intelligent terminal, such as a phone, a tablet, etc. Terminals may also be vehicle terminals. The following example is provided herein using vehicle terminals as an example.

Users may input information of a starting point and a destination on vehicle terminals, and input settings for a set period of time. Next, the user may tap (or press keys on) the vehicle terminal to enter into the next display interface which displays recommended routes from the starting point to the destination for the user to choose.

Figure 10:
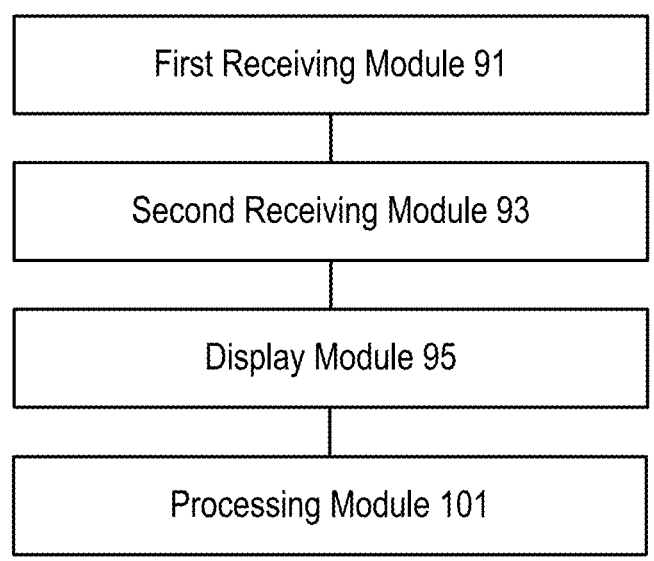
FIG. 10 is a block diagram of an apparatus for providing navigation according to some embodiments of the disclosure.

FIG. 10 is a block diagram of an apparatus for providing navigation according to some embodiments of the disclosure. As illustrated in FIG. 10, the apparatus described in connection with FIG. 9 may also comprise: a processing module 101 used for receiving an actual driving route and the position of vehicle on it to notify users of a first speed, wherein the first speed is the speed at which a vehicle is approaching a next traffic light, it can enable the vehicle to pass through the traffic light directly upon its arrival.

In the illustrated embodiment, the user driving his vehicle the entire time on the selected actual route at the first speed may be in what is called a "non-stopping" mode.

Based on above-described cases, utilizing the first speed informed by vehicle terminals, drivers can directly pass through each traffic light in the route without stopping, so that the vehicle can remain in motion.

Traffic information may include: real time traffic information, or traffic information during a set period of time predicted based on the real time traffic information and history; and/or, traffic sign information comprising at least one of traffic light information, road marking information and information of unexpected situations taking place on the road. The traffic light information may be information of red and green lights, for example, information of the ratio of red and green lights, time frame for when lights stay red and time frame for when lights stay green. Road marking information may be classified as time-phased traffic control information or all-time traffic control information which is planned in real time, and time-phased traffic control information and all-time traffic control information during a forecasting set period of time. Information of unexpected situations taking place on the road can be classified as real time information and forecasting information of accident addressing signs with traffic accidents.

Traffic information for a set period of time can be obtained from two resources. First, the traffic information during a set period of time in the future can be predicted based on current real-time traffic information by utilizing existing modeling patterns and predicting methods. Second, the traffic information during a set period of time in the future can be predicted based on current real-time traffic information and past traffic information (above-mentioned history of traffic information) by utilizing existing modeling patterns and predicting methods.

In the aforementioned embodiments, the transportation condition of each route during a set period of time in the future can be determined based on traffic information and traffic signs information of each route between a starting point and a destination, and a recommended route between the starting point and destination can be determined based on the transportation condition. Users can choose an actual driving route from recommended routes displayed on the interface on terminals, and on the actual route, users can drive at the first speed to pass through traffic lights directly without stopping. That is, users can arrive to the destination punctually and safely while keeping the vehicle in motion the entire time. Thereby improving user experience of navigation.

Figure 11:
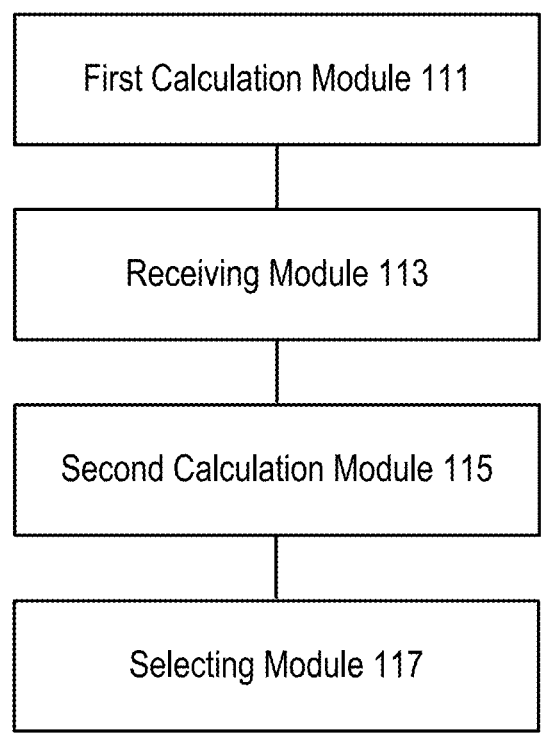
FIG. 11 is a block diagram illustrating an apparatus for providing navigation according to some embodiments of the disclosure.

FIG. 11 is a block diagram illustrating an apparatus for providing navigation according to some embodiments of the disclosure. In one embodiment, the apparatus of FIG. 11 may be configured to implement the methods discussed in connection with FIGS. 3 through 8.

In the illustrated embodiment, the apparatus may comprise: a first calculation module 111, a receiving module 113, a second calculation module 115 and a selecting module 117.

In one embodiment, the first calculation module 111 is used for receiving at least one route between the starting point and the destination based on the received starting point and destination.

In one embodiment, the receiving module 113 is used for receiving traffic information and traffic sign information of each of the at least one route.

In one embodiment, the second calculation module 115 is used for calculating a transportation condition of each route during a set period of time in the future at least based on traffic information and traffic sign information;

In one embodiment, the selecting module 117 is used for selecting at least one recommended route based on the transportation condition of each route from at least one route.

As illustrated above, the transportation condition of each route during a set period of time in the future is taken into consideration, which improves user experience and addresses the problems caused by current solutions that fail to consider the transportation condition in the future during navigation.

In an alternative embodiment, a set period of time in the future is selected based on past experience. For example, in general situations, the period of time can be set as an hour, which may cover the driving time from a starting point to a destination for most users. In one embodiment, the duration of the period of time can be determined based on the city where the user is located. Examples have already been given in connection with FIGS. 1 through 2, the details of which are not repeated herein for the sake of clarity.

The above-mentioned steps of the embodiment can operate on a server, which can be a cloud server, that is, a cloud computing platform.

The above-mentioned transportation condition may include a transportation time and the second calculation module may be used to calculate a transportation time of each route during a set period of time in the future at least based on traffic information and traffic light information included in the traffic sign information.

In some embodiments, traffic light information is an important component of the traffic sign information. Yet in other embodiments, traffic sign information also comprises other information such as road communication marking lights. Because traffic light information is of particular interest, the following example provides an exemplary explanation regarding traffic light information. In one embodiment, traffic light information may comprise the information of the ratio of red to green lights, for example, the red-state as the first duration (i.e., 60 s), the green-state as the second duration (30 s). Take a vehicle approaching a traffic light as an example, if the vehicle arrives when the light is red, the vehicle only has to wait a duration of 60 seconds until the light changes, before going; if the vehicle arrives when the light is green, then the vehicle can pass directly through the traffic light to go on, so long as the duration of 30 seconds when the light is green has not yet ended.

If information relative to traffic lights is calculated by the cloud computing platform, then after receiving a number of candidate routes, the cloud computing platform can receive the number of driving vehicles on candidate routes, speed of each vehicle and congestion condition of each candidate route during a set period of time from the traffic forecasting module; it can also receive information of the number of traffic lights and the ratio of traffic lights of each candidate route. Based on the received traffic information and traffic light information of each candidate route, the cloud computing platform can calculate transportation time for passing through each candidate route during a set period of time in the future, and based on the transportation time for passing through each candidate route, it can select at least one route as the recommended route from a number of candidate routes, and output it to the user via the display of the vehicle terminal.

Through the above-mentioned embodiments, traffic light information is considered, and based on transportation time for passing through each candidate route during a set period of time, the recommended route can be determined, this solution determines the recommended route from transportation time, and it fulfills the purpose of saving time and arriving at the destination safely and on time.

Figure 12:
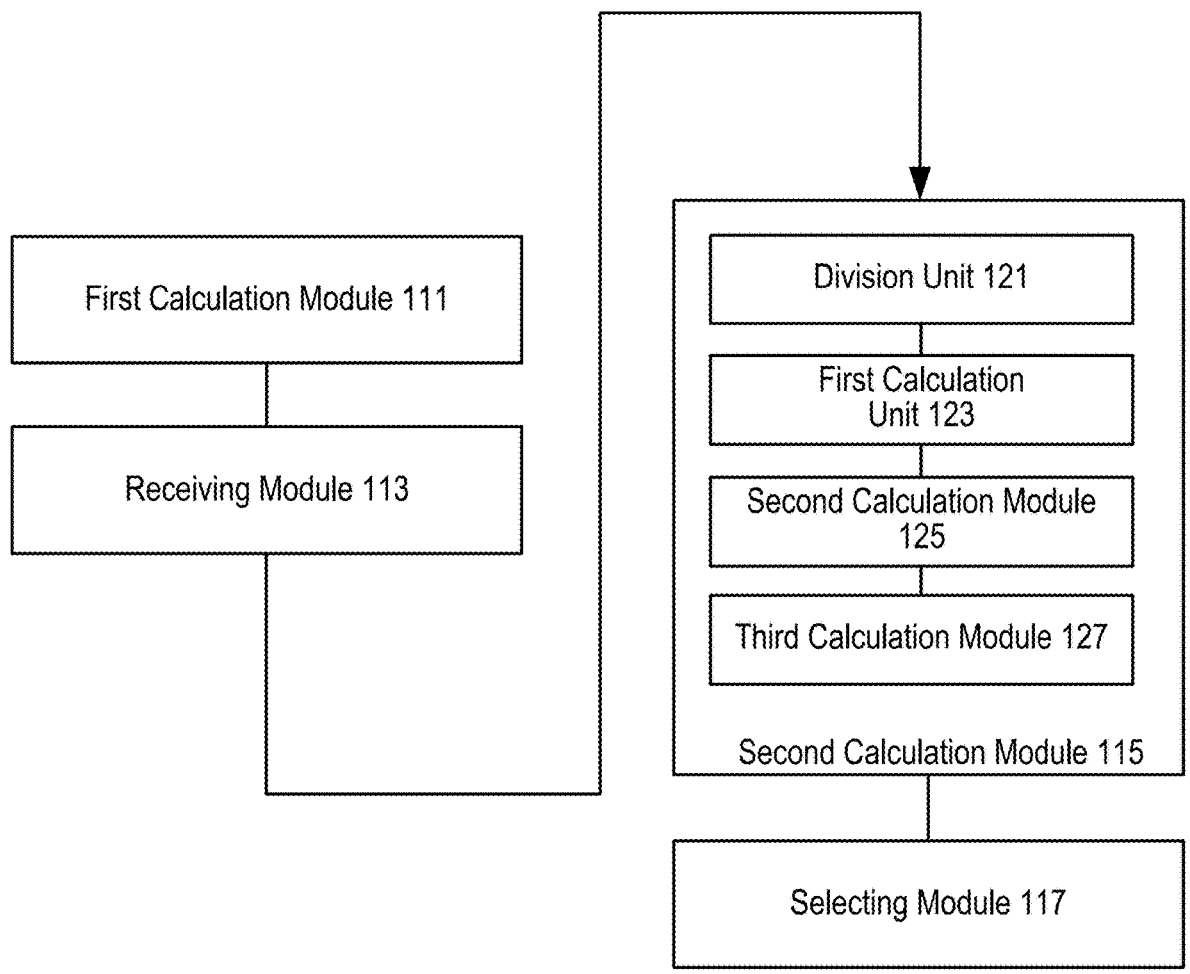
FIG. 12 is a block diagram illustrating a second calculation module according to some embodiments of the disclosure.

FIG. 12 is a block diagram illustrating a second calculation module according to some embodiments of the disclosure.

As illustrated, a second calculation module 115 comprises: a dividing unit 121 used for dividing each route into at least one section; a first calculation module 123 used for calculating a speed for passing through each section of the route based on traffic information of each route and calculating the transportation time for passing through the section based on the speed for passing through it; a second calculation module 125 used for calculating transportation time for passing through traffic lights of each route based on traffic light information; a third calculation module 127 used for calculating transportation time for passing through each route based on the time for passing through traffic lights of each route and the time for passing through all the sections of the route.

The above-mentioned process for dividing a route may be conducted by a server. For example, the cloud computing platform may break each route into fine-grained sections comprising at least one that is applied in the traffic forecasting module, through correlation with an invoker servlet for forecasting future traffic of the sections. The method for dividing a route also varies, for example, a route can be divided into at least one section through the following three methods: first, divide each route into at least one section based on turns (right turns or left turns) of each route; second, based on the number of traffic lights of each route, named as L, divide each route into sections of L+1; and third, calculate the total length of each route, based on the principle of average distribution, divide each route into at least one section.

In another embodiment, each route comprises a number of traffic lights (mentioned above), each traffic light is configured with a pattern of the ratio of red to green lights, under the condition where each traffic light has the same ratio, that is, the first time frame for when lights stay red is longer than the second time frame for when lights stay green, and the ratio between the two time frames is the first ratio, time for passing through traffic lights of each route can be obtained through calculating the time for the vehicle to pass through each traffic light.

Through the above-mentioned embodiment, the method for dividing each route into at least one section is adopted, transportation time for passing through each route can be determined more accurately, so as to recommend more convenient and time-saving routes to the user, thereby improving user experience of navigation.

In some situations, if the user can directly pass through traffic lights every time without stopping, then the driver may have a comparatively better experience. However, there has to be a speed control in this situation to ensure an arrival at traffic lights at a proper speed.

In order to achieve this, the speed that can achieve the above-mentioned effect can be calculated through the above-mentioned first calculation module 123. The above-mentioned first calculation module 123 is used for calculating at least one first speed based on traffic information of each route, wherein the first speed is the speed at which a vehicle approaches a traffic light, and the speed can enable the vehicle to pass through the traffic light directly. The third calculation module 117 is used for calculating transportation time for passing through the route during a set period of time based on at least one first speed.

Similarly, the server can calculate the first speed. For example, the cloud computing platform may break each route into fine-grained sections comprising at least one that is applied in the traffic forecasting module, through correlation with an invoker servlet for forecasting future traffic of the sections, after which the cloud computing platform may calculate the speed (the first speed mentioned above) that can enable the vehicle to pass through each traffic light directly, based on traffic information of at least one section during a set period of time after a route is divided and traffic light information of each route. A corresponding first speed may then be calculated based on information of present section and information of present traffic light when approaching the traffic light.

Through the above-mentioned embodiment, the user can pass directly through each traffic light of the route without stopping by utilizing the calculated first speed, so that the user can arrive safely and punctually to the destination while maintaining motion the entire time along the route. However, the user may not be able to drive at the maximum speed when directly passing through traffic lights, in such a situation, another optional embodiment is introduced.

In another embodiment, the calculation module 123 is used for calculating a first time for passing through each section at the speed of at least one first speed. A third calculation unit 127 may be used for calculating a highest speed when approaching each traffic light of the route and transportation time spent before arriving at a traffic light at the highest speed, and add the transportation time with time spent in stopping at the traffic light to obtain a second time for passing through each section. The third calculation module 127 may also be used for comparing the first time and the second time of each section to calculate the minimum time for passing through each route.

Continuing the example of using a cloud computing platform, the platform may break each route into at least one section in the traffic forecasting module with traffic lights as boundaries, through correlation with an invoker servlet for forecasting future traffic of the sections. The cloud computing platform can calculate the speed that enables the vehicle to pass through each traffic light based on traffic information of at least one section after each route is divided during a set period of time and traffic light information of each route. The first speed that can enable the vehicle to pass through traffic lights directly can be calculated based on traffic information of each section and corresponding traffic light information during a set period of time in the future. The platform may divide a route into sections with traffic lights as boundaries, each section corresponding to a first speed, and calculate time (the first time mentioned above) for passing each section based on the first speed. Then, the platform may calculate the maximum speed when approaching the traffic light corresponding to each section and transportation time spent before approaching the traffic light corresponding to each section at the maximum speed based on traffic information of each route after division and calculate the sum of the transportation time and time spent in stopping at the traffic light and take it as the second time for passing through each section.

Furthermore, the platform may compare the first time and the second time of the each section to determine a minimum time for passing through each section and calculate minimum transportation time for passing through each route. This means that the user can pass through each section at a speed (the maximum speed or the first speed) corresponding to the minimum time, that is, the user can drive at the first speed in some sections and the maximum speed in the rest of the sections, so as to arrive at the destination with minimum transportation time spent.

Through the above-mentioned embodiment, by combining the two solutions of both the speed and the maximum speed, minimum time for passing each route can be determined, so as to provide the user with a driving plan of better convenience and safety and thereby improve user experience of navigation.

Traffic information of the above-mentioned embodiment comprises: real time traffic information, or traffic information during a set period of time, predicted based on the real time traffic information and history of traffic information; and/or traffic sign information, comprising at least one of the followings: traffic light information, road marking information and information of unexpected situations taking place on the road. The traffic light information may be information of red and green lights, for example, information of the ratio of red and green lights, time frame for when lights stay red and time frame for when lights stay green. Information of road markings may be classified as time-phased traffic control information or all-time traffic control information which is planned in real time, and time-phased traffic control information and all-time traffic control information during a forecasting set period of time. Information of unexpected situations taking place on the road can be classified as real time information and forecasting information of accident addressing signs with traffic accidents.

The above-mentioned solution can be implemented in the traffic forecasting module and the traffic information during a set period of time in the future can be predicted based on current real-time traffic information by utilizing existing modeling patterns and predicting methods. Alternatively, the traffic information during a set period of time in the future can be predicted based on current real-time traffic information and past traffic information (the above-mentioned history of traffic information) by utilizing existing modeling patterns and predicting methods.

Through the above-mentioned embodiment, a solution for providing vehicles with driving advice is generated based on traffic information and traffic light information on the cloud platform. The solution introduces information of the ratio of traffic lights, perspective traffic forecasts and estimates of arrival time based on forecasting traffic, accurately takes into account the influence traffic lights have on traffic, adopts the forecasting traffic and estimates of arrival time based on forecasting traffic as inputs to calculate the recommended route and speed for passing through the route, and it can provide real time adjustments of driving advice based on the traffic. Therefore, through the solution, information of the ratio of traffic lights is taken into consideration, and through calculating traffic during a set period of time in the future, it improves user experience and addresses the problems caused by current solutions that fail to consider the transportation condition in the future during navigation.

The present embodiment of application may provide a computer terminal that can be any computer terminal apparatus of the group of computer terminals. Preferably, in the present embodiment, the above-mentioned computer terminal can be replaced by devices such as mobile terminals.

Preferably, in the present embodiment, the above-mentioned computer terminal can be positioned on at least one network device of a number of network devices.

In the present embodiments, the above-mentioned computer terminal can implement the codes of the following steps of the method of navigation: receive a starting point and a destination; determine a recommended route between the starting point and the destination, wherein the recommended route is determined Based on the transportation condition of each route between the starting point and the destination, the transportation condition is transportation condition during a set period of time in the future, calculated based on traffic information and traffic sign information of each route; display the recommended route.

Figure 13:
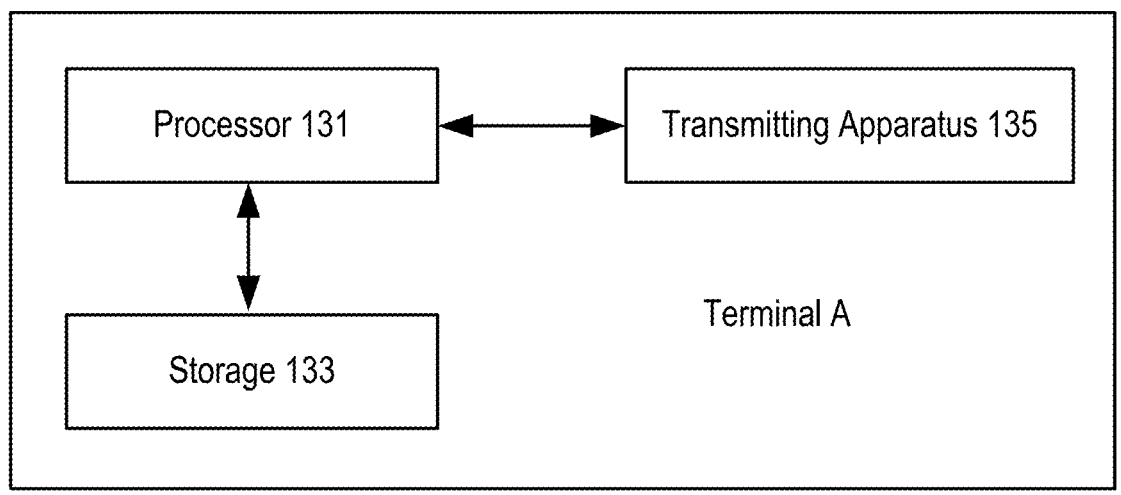
FIG. 13 is a block diagram illustrating a terminal for providing navigation according to some embodiments of the disclosure.

FIG. 13 is a block diagram illustrating a terminal for providing navigation according to some embodiments of the disclosure.

In one embodiment, the terminal can be a vehicle terminal or a mobile terminal. As is shown in FIG. 13, the terminal A may comprise: one or more processor 131, storage 133 and a transmitting apparatus 135. The structure shown in FIG. 13 can also be the structure of computer terminals, the cloud platform or other servers can also be viewed as being made up of one or more computer terminals.

Storage 133 can store software programs and modules, such as the program instructions/modules corresponding to the method of navigation and apparatus embodiments of the disclosure. Processor 131 implements various functions and data processing operations. That is, processor 131 performs the above-mentioned method of navigation through operating the software programs stored in the storage. The storage may comprise a high-speed RAM, and also a NVM, such as one or more magnetic storage devices, flash memory or other nonvolatile solid-state memory. In some examples, storage may further include storage that is set remote relative to processor 131, which can connect to a mobile terminal A through a network. In these embodiments, the network may include, but is not limited in, the Internet, intranets, local area networks, mobile communication networks or a combination thereof.

The processor 131 can invoke the information stored in the storage 133 and application programs through a transmitting apparatus 135, so as to implement the following steps: receive a starting point and a destination; determine a recommended route from the starting point to the destination, wherein the recommended route is selected based on a transportation condition of each route between the starting point and the destination, wherein the transportation condition of each route is a transportation condition during a set period of time in the future calculated from traffic information and traffic sign information of each route; display the recommended route.

Preferably, the above-mentioned processor 131 can also implement program code performing the following steps: determine the actual driving route and the a user's position on it, notify the user of a first speed, wherein the first speed is the speed at which a vehicle is approaching a next traffic light, and the speed can enable the vehicle to pass through the traffic light directly upon its arrival.

Preferably, the above-mentioned processor can also implement program code performing the following steps: traffic information comprises real time traffic information, or traffic information during the set period of time predicted based on the real time traffic information and a history of traffic information; and/or the traffic sign information, comprising at least one of traffic light information, road marking information and information of unexpected situations taking place on the road.

The processor can also implement program code of one or more steps of the embodiments illustrated in FIGS. 1 through 8, the details of which are not repeated herein for the sake of clarity.

According to the previously discussed embodiments of the disclosure, the terminal can receive a starting point and a destination; determine a recommended route from the starting point to the destination, wherein the recommended route is selected based on a transportation condition of each route between the starting point and the destination, wherein the transportation condition of each route is a transportation condition during a set period of time in the future calculated from traffic information and traffic sign information of each route; and display the recommended route. By calculating the transportation condition during a set period of time in the future, embodiments of this application have improved user experience and solved the problems caused by current solutions that fail to consider the transportation condition in the future during navigation and has improved user experience.

Those of ordinary skill in the art can construe that FIG. 13 is only a diagrammatic sketch of the structure, computer terminals can also be terminal devices such as smart phones (such as Android phones, iOS phones), tablets, palmtops, mobile Internet Devices (MIDs) and PADs. FIG. 13 does not define the structure of the above-mentioned electronic devices. For example, computer terminal A can also comprise more or less components (i.e., network interfaces and display devices) than those in FIG. 13, or has different configuration from that of FIG. 13.

A person skilled in the art can construe that part or all of the steps of various methods of the above-mentioned embodiments can be completed by hardware related to terminal devices instructed by programs, the program can be stored in a computer readable storage medium which may include: flash drivers, ROM, RAM, magnetic disks and optic disks.

The present embodiment of application also provides a storage medium. In this embodiment, the above-mentioned a storage medium can store program codes implemented by the method of navigation provided by the above-mentioned embodiments described in connection with FIGS. 1 through 2.

In this embodiment, the above-mentioned storage medium can be positioned in any computer terminal of the group of computer terminals in the computer network, or be positioned in any mobile terminal of the group of mobile terminals.

In the embodiment, the storage medium is set to implement the program codes of the following steps: receive a starting point and a destination; receive a recommended route from the starting point to the destination, wherein the recommended route is selected based on a transportation condition of each route between the starting point and the destination, wherein the transportation condition of each route is a transportation condition during a set period of time in the future calculated from traffic information and traffic sign information of each route; display the recommended route.

Optionally, the storage medium is set to implement the program codes of the following steps: determine the actual driving route and the position on it, notify the user of a first speed, wherein the first speed is the speed at which a vehicle is approaching a next traffic light, and the speed can enable the vehicle to pass through the traffic light directly upon its arrival.

The storage medium can also store program codes of one or more steps for implementing the embodiments illustrated in connection with FIGS. 1 through 8, the details of which are not repeated herein for the sake of clarity.

Adopting the embodiments of the disclosure, it can receive a starting point and a destination; determine a recommended route from the starting point to the destination, wherein the recommended route is selected based on a transportation condition of each route between the starting point and the destination, wherein the transportation condition of each route is a transportation condition during a set period of time in the future calculated from traffic information and traffic sign information of each route; display the recommended route. By calculating the transportation condition during a set period of time in the future, embodiments of this application have solved the problems caused by current solutions that fail to consider the transportation condition in the future during navigation and has improved user experience.

In the above-mentioned embodiments of the disclosure, the description of each embodiment has its emphasis, if there are some parts that are not described in detail, relative description of other embodiments can be taken as references.

In embodiments provided by the disclosure, it shall be understood that the disclosed technical contents can be achieved through other methods. Wherein the above-mentioned apparatus embodiments are only general diagrammatic sketches, for example, the division of the unit is only a division based on logic function, however, there can be other division methods in practical situations, for example, more than one units or assemblies can be combined or integrated into another system, or some features can be ignored or not implemented at all. Additionally, the shown or discussed inter-coupling or direct coupling or communication connection can be indirect coupling or communication connection between units or modules through some interfaces, and it can be electronic or in other forms.

The units given as division parts may or may not be physically separated, the parts shown as units may or may not be physical units, that is, they can be positioned somewhere else or can be scattered over more than one network units. Some or all of the units can be selected based on practical needs to achieve the purpose of the present embodiment.

Moreover, in the present embodiment, all the functional units can be integrated into one processing unit, or each unit exists independently, or two or more than two units are integrated into one unit. The above-mentioned integrated unit can be achieved in the form of hardware, or in the form of software functional unit.

If the integrated unit is realized in the form of software functional unit and is sold or used as an independent product, it can be stored in a computer readable storage medium. Based on such an understanding, the technical solution of the disclosure in nature, or in other words, its contribution to existing technologies can be presented in the form of software products, the computer software product is stored in a memory medium (ROM/RAM, diskette and disk), comprising a number of instructions enabling a terminal device (mobile phone, computer, server, or network apparatus) that implements the methods described in the embodiments of the disclosure. The storage medium mentioned above includes various media that can store program codes, such as USB drive, ROM, RAM, mobile hard disk drive, disk or optic disk.

The above are merely preferable embodiments of the disclosure, and it should be noted that, for those of ordinary skill in the art, on condition that there is no deviation from the theory of the disclosure, some improvements and modifications can be adopted, but these improvements and modifications shall also be regarded within the scope of protection.

The invention claimed is:

1. A method comprising:
dividing a route into one or more sections;
calculating a speed that a vehicle will pass through each section of the one or more sections based on traffic information associated with the route and a speed at which the vehicle will pass through each section of the one or more sections;
calculating an amount of time required to pass through each section of the route;
calculating an amount of time required to pass through traffic lights present on the route based on traffic light information; and
calculating a transportation time of the route based on the amount of time required to pass through traffic lights present on the route and the amount of time required to pass through each section of the route.

2. The method of claim 1, the calculating the speed further comprising retrieving a current speed of the vehicle from a terminal installed in the vehicle.

3. The method of claim 1, further comprising receiving traffic information and traffic sign information associated with the plurality of routes, the traffic information selected from the group consisting of real-time traffic information and traffic information during a set period of time predicted based on real-time traffic information and historical traffic information, the traffic sign information selected from the group consisting of traffic light information, road marking information and information of unexpected situations taking place on a route.

4. The method of claim 3, the road marking information comprising time-phased traffic control information or all-time traffic control information.

5. The method of claim 3, the information of unexpected situations taking place on the route comprising real time information and predicted information of traffic accidents.

6. The method of claim 1, the calculating the amount of time required to pass through traffic lights present on the route based on traffic light information comprising calculating the amount of time required to pass through traffic lights based on a ratio of red-green lights and a length of time the red-green lights are red or green.

7. The method of claim 1, the calculating the transportation time being performed periodically during operation of the vehicle.

8. An apparatus comprising:
one or more processors; and
a non-transitory memory storing computer-executable instructions therein that, when executed by the processor, cause the apparatus to perform the operations of:
dividing a route into one or more sections;
calculating a speed that a vehicle will pass through each section of the one or more sections based on traffic information associated with the route and a speed at which the vehicle will pass through each section of the one or more sections;
calculating an amount of time required to pass through each section of the route;
calculating an amount of time required to pass through traffic lights present on the route based on traffic light information; and
calculating a transportation time of the route based on the amount of time required to pass through traffic lights present on the route and the amount of time required to pass through each section of the route.

9. The apparatus of claim 8, the calculating the speed further comprising retrieving a current speed of the vehicle from a terminal installed in the vehicle.

10. The apparatus of claim 8, the computer-executable instructions further causing the apparatus to perform the operation of receiving traffic information and traffic sign information associated with the plurality of routes, the traffic information selected from the group consisting of real-time traffic information and traffic information during a set period of time predicted based on real-time traffic information and historical traffic information, the traffic sign information selected from the group consisting of traffic light information, road marking information and information of unexpected situations taking place on a route.

11. The apparatus of claim 8, the road marking information comprising time-phased traffic control information or all-time traffic control information.

12. The apparatus of claim 8, the information of unexpected situations taking place on the route comprising real time information and predicted information of traffic accidents.

13. The apparatus of claim 8, the calculating the amount of time required to pass through traffic lights present on the route based on traffic light information comprising calculating the amount of time required to pass through traffic lights based on a ratio of red-green lights and a length of time the red-green lights are red or green.

14. A non-transitory computer readable storage medium for tangibly storing computer program instructions capable of being executed by a computer processor, the computer program instructions defining the steps of:
dividing a route into one or more sections;
calculating a speed that a vehicle will pass through each section of the one or more sections based on traffic information associated with the route and a speed at which the vehicle will pass through each section of the one or more sections;
calculating an amount of time required to pass through each section of the route;

calculating an amount of time required to pass through traffic lights present on the route based on traffic light information; and calculating a transportation time of the route based on the amount of time required to pass through traffic lights present on the route and the amount of time required to pass through each section of the route.

15. The non-transitory computer-readable medium of claim 14, the calculating the speed further comprising retrieving a current speed of the vehicle from a terminal installed in the vehicle.

16. The non-transitory computer-readable medium of claim 14, the computer program instructions further defining the step of receiving traffic information and traffic sign information associated with the plurality of routes, the traffic information selected from the group consisting of real-time traffic information and traffic information during a set period of time predicted based on real-time traffic information and historical traffic information, the traffic sign information selected from the group consisting of traffic light information, road marking information and information of unexpected situations taking place on a route.

17. The non-transitory computer-readable medium of claim 15, the road marking information comprising time-phased traffic control information or all-time traffic control information.

18. The non-transitory computer-readable medium of claim 15, the information of unexpected situations taking place on the route comprising real time information and predicted information of traffic accidents.

19. The non-transitory computer-readable medium of claim 14, the calculating the amount of time required to pass through traffic lights present on the route based on traffic light information comprising calculating the amount of time required to pass through traffic lights based on a ratio of red-green lights and a length of time the red-green lights are red or green.

20. The non-transitory computer-readable medium of claim 14, the calculating the transportation time being performed periodically during operation of the vehicle.

* * * * *